United States Patent
Yasuda et al.

(10) Patent No.: US 6,807,724 B2
(45) Date of Patent: Oct. 26, 2004

(54) MOTOR ASSEMBLING APPARATUS

(75) Inventors: Yuji Yasuda, Sano (JP); Hideyuki Minami, Kiryu (JP); Kazuo Iwashita, Kiryu (JP); Kazuhiro Yamazaki, Nitta-gun (JP); Yoshinori Kojima, Isesaki (JP); Shuji Uehara, Maebashi (JP); Takayuki Ishizeki, Sawa-gun (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 10/354,137

(22) Filed: Jan. 30, 2003

(65) Prior Publication Data

US 2003/0150103 A1 Aug. 14, 2003

(30) Foreign Application Priority Data

Feb. 8, 2002 (JP) ........................................ 2002-032960

(51) Int. Cl.$^7$ .............................................. H02K 15/14
(52) U.S. Cl. .............................. 29/732; 29/596; 29/469; 29/281.1
(58) Field of Search ............................. 361/143; 29/596, 29/598, 732, 733, 736, 469, 281.1; 310/90.5, 259, 268, 156.53; 335/284, 285, 302

(56) References Cited

U.S. PATENT DOCUMENTS

| | | | | |
|---|---|---|---|---|
| 3,990,141 A | * | 11/1976 | Stark ........................... | 29/596 |
| 4,737,753 A | * | 4/1988 | Oudet ......................... | 335/284 |
| 5,062,200 A | * | 11/1991 | Lanfranco .................... | 29/732 |
| 5,075,814 A | * | 12/1991 | Kubota et al. .............. | 335/284 |
| 5,272,803 A | * | 12/1993 | Harrison et al. ............. | 29/596 |
| 5,659,279 A | * | 8/1997 | Janssen et al. .............. | 335/284 |
| 5,745,970 A | * | 5/1998 | Sakashita et al. ........ | 29/407.05 |
| 2003/0150103 A1 | * | 8/2003 | Yasuda et al. ................ | 29/732 |

FOREIGN PATENT DOCUMENTS

JP   2003-289653   * 10/2003

* cited by examiner

*Primary Examiner*—Minh Trinh
(74) *Attorney, Agent, or Firm*—Wenderoth, Lind & Ponack, L.L.P.

(57) ABSTRACT

A motor assembling apparatus is adapted to magnetize permanent magnets for the field and mount a stator 2 and an armature 3 in the same apparatus. The apparatus comprises a magnetizing unit 24 having an outer magnetizing coil 29 and an inner magnetizing coil 30, a vertically movable stator support 23 for supporting the lower end of the stator 2, an armature holder 25 to the outside of which the stator support 23 can be fitted and a stator keeping jig 22 arranged above the stator support 23. The stator 2 is placed on the stator support 23 and pinched between the stator keeping jig 22 and the stator support 23 to move it vertically and magnetize it by means of the magnetizing unit 24. After magnetizing the permanent magnets, the stator 2 is raised immediately by means of the stator support 23 and fitted to the armature 3.

9 Claims, 7 Drawing Sheets

MOTOR ASSEMBLING APPARATUS

BACKGROUND OF THE INVENTION

1. Field of the Invention

This invention relates to an apparatus for assembling a permanent magnet field motor. More particularly, the present invention relates to a technique that can effectively be applied to a motor comprising neodymium type rare earth magnets or the like.

2. Related Art Statement

Conventionally, motors comprising ferrite magnets as field magnets are prepared by arranging pieces of an unmagnetized magnet material at the stator side and magnetizing the pieces so as to turn them into field magnets after mounting the stator and the armature. However, when neodymium type or samarium type rare earth magnets are used as field magnets and the magnetization process is conducted after mounting the stator and the armature, it is difficult to realize field magnets that are magnetized to show a high magnetic flux density because the magnetizing yoke can only be arranged outside the stator after mounting the armature and hence the rare earth material cannot be sufficiently exposed to magnetic fluxes. Therefore, when rare earth magnets are used, it is necessary to employ a process of magnetizing the field magnets to make them show a high magnetic flux density firstly by magnetizing only the stator itself by means of a magnetizer and subsequently mounting the stator and the armature in order to fully exploit the potential of the rare earth magnet.

However, when such a process is employed and the stator is inserted into the armature, the latter is drawn into the former instantaneously because the field magnets are very powerful. Therefore, this process is dangerous when the armature is inserted by hand and hence it is accompanied by a problem of poor mounting performance. Furthermore, since the armature is abruptly and fiercely drawn into the stator at the time of assembling, the armature is adsorbed to the field magnets before it is inserted to the right position in the stator. In other words, it is difficult to insert the armature to the right position. If the armature is forcibly pushed into the stator, both the armature and the stator can be damaged.

Thus, when rare earth magnets are used as field magnets, an apparatus comprising dedicated jigs needs to be employed for the purpose of mounting the armature to the stator. For example, Japanese Patent Application Laid-Open Publication No. 2001-251817 discloses a motor assembling apparatus adapted to hold the armature and mount the stator to the outside of the armature. The invention involves the use of a jig for holding one of the opposite ends of the armature, an armature holder for holding the other end of the armature and a stator holder for holding the stator outside the armature, which stator holder is movable in the direction of the central axis. According to the invention, the armature holder is made to hold the other end of the armature, while the stator holder is being moved, and the stator is mounted outside the armature with a predetermined gap separating them. With this arrangement, the stator is prevented from being adsorbed by the armature so that the armature and the stator can be mounted smoothly and easily so as to make them show a desired positional relationship when rare earth magnets are used as field magnets.

If such an apparatus is used, the operation of magnetizing the field magnets and that of mounting the armature and the stator are conducted independently. More specifically, the stator is put on a magnetizer to magnetize the field magnets and subsequently the magnetized stator is put on an assembling apparatus of the above described type to mount it to the right position relative to the armature. However, when rare earth magnets are used as field magnets, they can adsorb dust particles and other debris so that foreign objects can enter the inside of the stator between the operation of magnetizing the field magnets and that of mounting the armature and the stator. Thus, the armature needs to be mounted to the right position relative to the magnetized stator immediately after the magnetizing operation. This means that it is not feasible to provide a large stock of prepared stators. In other words, the operation of magnetizing the stator and that of mounting the armature and the stator need to be conducted almost at the same time at the cost of efficiency of operation.

Additionally, if a step of using an assembling apparatus dedicated to mounting the armature and the stator as described above is put into the process, both the capital investment and the number of assembling steps increase to raise the overall manufacturing cost.

SUMMARY OF THE INVENTION

Therefore, it is the object of the present invention to provide a motor assembling apparatus that has a simple structure and can perform both the operation of magnetizing the stator field magnets and that of mounting the armature to the stator continuously on the apparatus to improve the efficiency of operation and prevent foreign objects from entering the stator.

According to the invention, the above object is achieved by providing a motor assembling apparatus for assembling a motor having a cylindrical stator with permanent magnets rigidly adhering to the inner peripheral surface thereof and an armature rotatably arranged in the stator, the apparatus comprising: a magnetizer having an outer magnetizing coil to be arranged outside the stator and an inner magnetizing coil to be arranged inside the stator; a stator support for supporting a lower end part of the stator, the stator support being arranged so as to be vertically movable between the outer magnetizing coil and the inner magnetizing coil along the central axial line of the stator; and an armature holder for holding the armature at one of the opposite ends thereof, the armature holder being arranged above the magnetizer, the stator support being adapted to be fitted to the outside of the armature holder; the stator having the permanent magnets magnetized by the magnetizer being fitted to the outside of the armature held on the armature holder by means of the stator support.

Thus, according to the invention, since the magnetized stator is immediately fitted to the armature held on the armature holder by way of a sliding movement of the stator support, the opportunity for foreign objects to enter the stator is minimized so as to improve the reliability of the manufactured product. Additionally, since the magnetizing step and the mounting step are conducted continuously in a same apparatus, the efficiency of operation is improved and the number of assembling steps is reduced.

A stator keeping jig may be additionally arranged above the stator support in a motor assembling apparatus according to the invention in such a way that it abuts an upper end part of the stator mounted on the stator support and is adapted to be vertically movable, while pinching the stator between itself and the stator support. With this arrangement, the stator can be pinched between the stator keeping jig and the stator support to stabilize the behavior of the stator and make it possible to reliably mount the armature and the stator.

The stator may be provided with a cylindrical yoke, permanent magnets rigidly adhering to the inner peripheral surface of the yoke and a magnet cover arranged in the inside of the permanent magnets for covering the inner surfaces of the permanent magnets. With this arrangement, since the permanent magnets are covered by the magnet cover, the armature is prevented from directly touching the permanent magnets and the permanent magnets are prevented from being damaged to produce cracks and/or notches when the stator is fitted to the armature.

On the other hand, rare earth magnets may be used as the permanent magnets in the motor assembling apparatus according to the invention. Then, although powerful rare earth magnets can adsorb dust particles and other debris, the opportunity for foreign objects to enter the stator is minimized so as to improve the reliability of the manufactured product because the armature is immediately fitted to the magnetized stator. Additionally, since the magnetizing step and the mounting step are conducted continuously in a same apparatus, the otherwise dangerous operation is automated to improve both the safety and the efficiency of operation and the number of assembling steps is reduced. Furthermore, it is possible to provide an armature holder having no functional feature of aligning the armature with the stator to allow it to show a simple structure that is adapted to simply hold one of the opposite ends of the armature.

The above described object and other objects of the present invention will become apparent along with novel features of the invention more fully from the description of the specification given below in conjunction with the accompanying drawings.

DESCRIPTION OF THE PREFERRED EMBODIMENT

Figure 1:
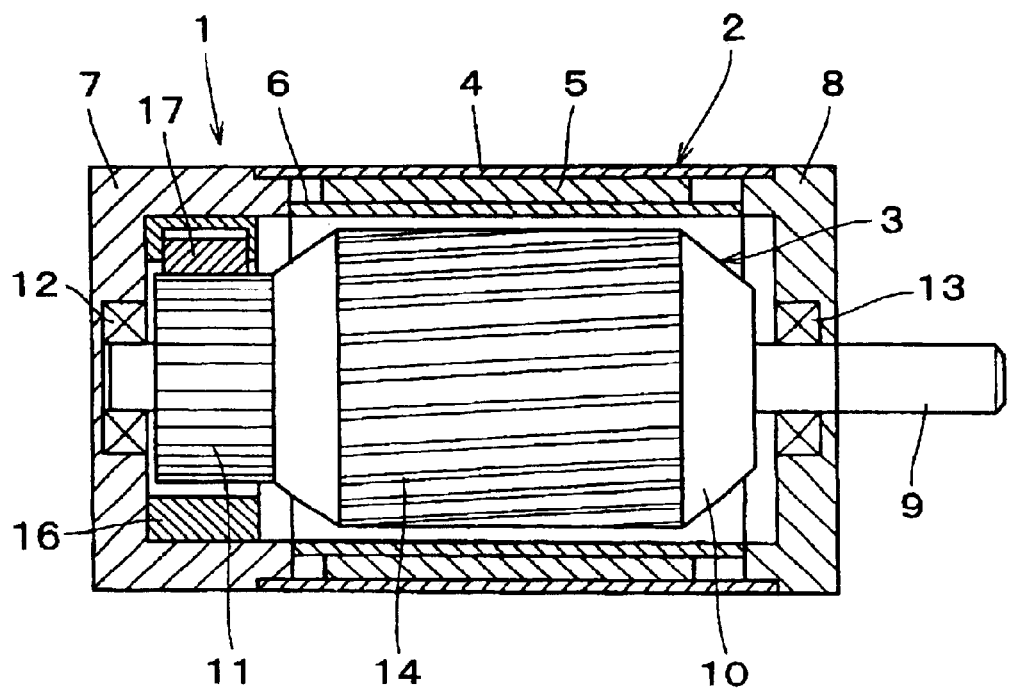
FIG. 1 is a schematic cross sectional view of a motor that can be assembled by means of an assembling apparatus according to the invention.
Figure 2:
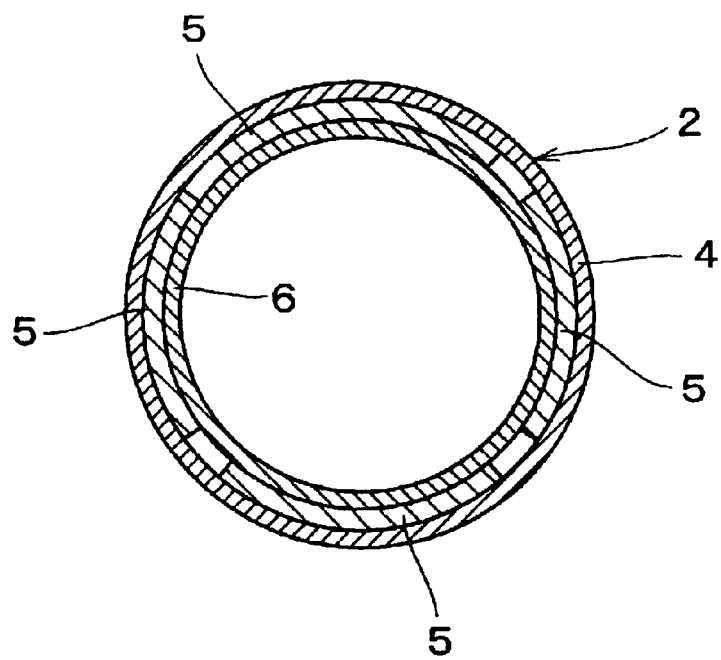
FIG. 2 is a schematic cross sectional view of the stator that is used in the motor of FIG. 1.

Now, the present invention will be described in greater detail by referring to the accompanying drawings that illustrate a preferred embodiment of the invention. FIG. 1 is a schematic cross sectional view of a motor that can be assembled by means of an assembling apparatus according to the invention and FIG. 2 is a schematic cross sectional view of the stator that is used in the motor of FIG. 1.

As shown in FIG. 1, the motor 1 is a permanent magnet field type DC motor comprising a stator 2, in which an armature 3 is rotatably arranged. As shown in FIG. 2, the stator 2 comprises a cylindrical yoke 4, a plurality of permanent magnets 5 rigidly secured to the inner peripheral surface of the yoke 4 for producing a magnetic field and a magnet cover 6 fitted to cover the inner peripheral surfaces of the permanent magnets 5. The permanent magnets 5 are typically of the neodymium or samarium cobalt type rare earth that produces a field with a high magnetic flux density. Brackets 7, 8 are fitted respectively to the opposite ends of the stator 2.

The armature 3 is composed of a rotary shaft 9, an armature core (and coil) 10 and a commutator 11, of which the armature core 10 and the commutator 11 are rigidly secured to the rotary shaft 9. The rotary shaft 9 is rotatably supported by bearings 12, 13 arranged in the brackets 7, 8. The armature core 10 has a plurality of axially extending slots 14 for receiving a wire wound around the armature core 10. A brush 17 is housed in a brush holder 16 and slidably held in contact with the surface of the commutator 11. The brush holder 16 is contained in the bracket 8 and rigidly secured to the bracket 7 by means of screws or the like.

Figure 3:
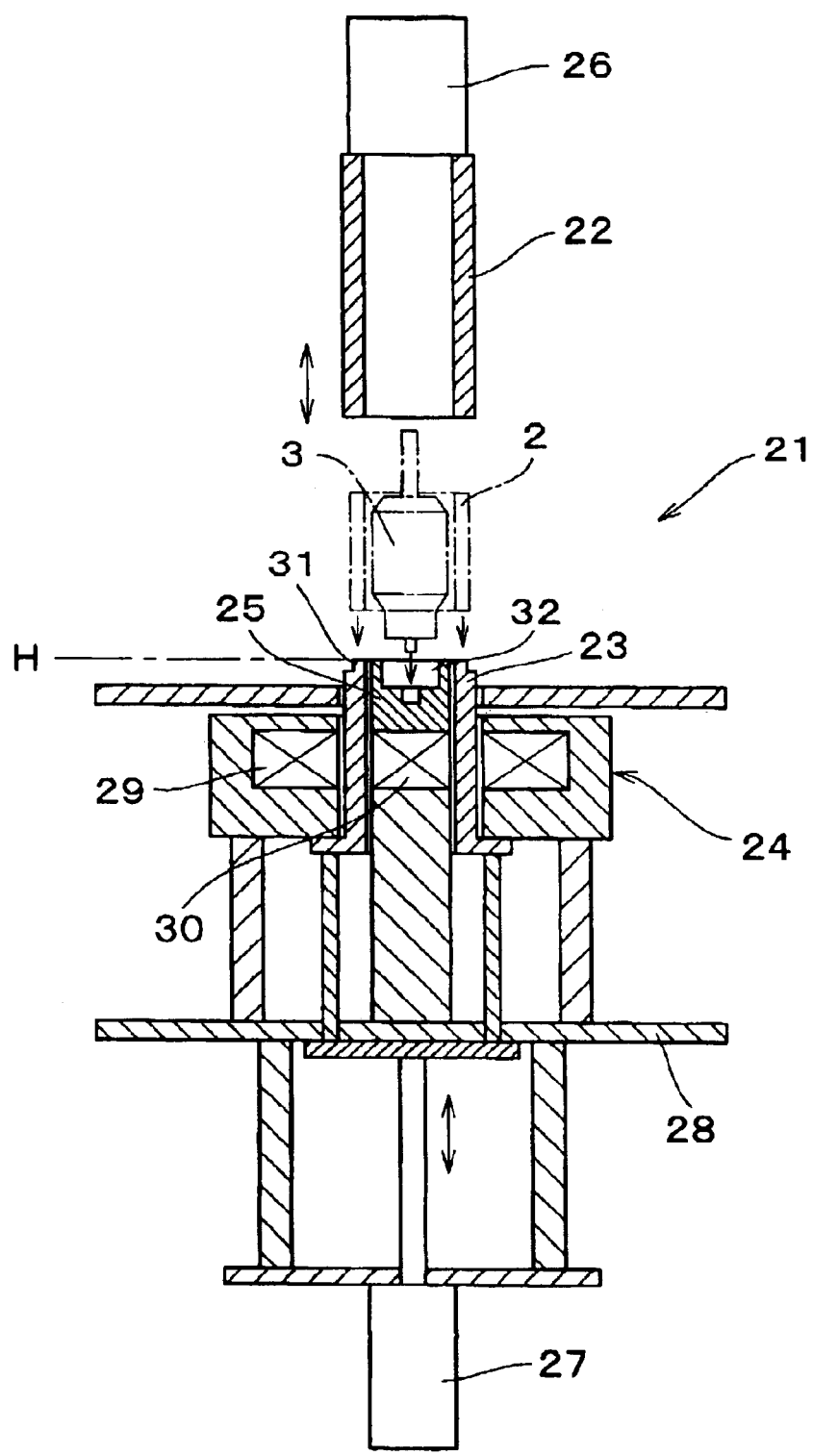
FIG. 3 is a schematic cross sectional view of an embodiment of a motor assembling apparatus according to the invention, illustrating the configuration thereof.

For a motor 1 having the above described configuration, the permanent magnets 5 fitted to the stator 2 are magnetized and the stator 2 and the armature 3 are mounted in a same assembling apparatus according to the invention. FIG. 3 is a schematic cross sectional view of an embodiment of a motor assembling apparatus according to the invention, illustrating the configuration thereof.

Referring to FIG. 3, the embodiment of the motor assembling apparatus 21 comprises a stator keeping jig 22, a stator support 23, the stator keeping jig 22 and the stator support 23 being vertically movable, a magnetizing unit 24 and an armature holder 25, the magnetizing unit 24 and the armature holder 25 being rigidly fitted to the inside of the apparatus. The stator keeping jig 22 and the stator support 23 are driven by respective air cylinders 26, 27 so as to vertically move along a same axial line. The magnetizing unit 24 and the armature holder 25 are immovably secured to a support plate 28 arranged in the apparatus. The stator keeping jig 22 and the stator support 23 are adapted to move relative to each other respectively at the outside and at the inside of the magnetizing unit 24 and the armature holder 25.

The magnetizing unit 24 comprises a ring-shaped outer magnetizing coil 29 and an inner magnetizing coil 30 inserted to the center of the outer magnetizing coil 29. A gap is provided between the magnetizing coils 29, 30 and the cylindrical stator support 23 is vertically movably inserted into the gap. The stator support 23 and the stator 2 have a substantially same diameter and are vertically movable between an upper position H and a lower position L (see FIG. 6). A stator receiving section 31 is formed at the top of the stator support 23 to receive the stator 2. More specifically, the stator receiving section 31 comes into facet-contact with the corresponding end of the stator 2 so that the stator 2 may be received coaxially by the stator support 23. As the stator support 23 is lowered under this condition, the stator 2 comes to be placed between the magnetizing coils 29, 30 and the pieces of a magnet material fitted to the stator are magnetized.

The armature holder 25 is arranged above the inner magnetic coil 30 and adapted to hold the armature 3 at one of the opposite ends thereof. The armature holder 25 is made to show a diameter smaller than the inner diameter of the stator support 23 so that the stator support 23 may be placed outside the armature holder 25. Differently stated, the armature holder 25 may be placed in the stator support 23. An armature holding hole 32 is bored at the top of the armature holder 25. As the lower end of the armature 3 is fitted into the armature holding hole 32 for mutual engagement, the armature 3 stands by itself on the armature holder 25.

On the other hand, the stator keeping jig 22 is arranged at an upper part of the apparatus. The stator keeping jig 22 is arranged coaxially with the stator 2, which is placed on the stator support 23, and formed by a cylindrical member having a diameter substantially the same as the stator 2. The stator keeping jig 22 is vertically movable along the central axial line of the stator 2. As the stator keeping jig 22 is lowered, the lower end thereof comes to abut the upper end of the stator 2 to pinch the stator 2 between itself and the stator support 23.

Figure 4:
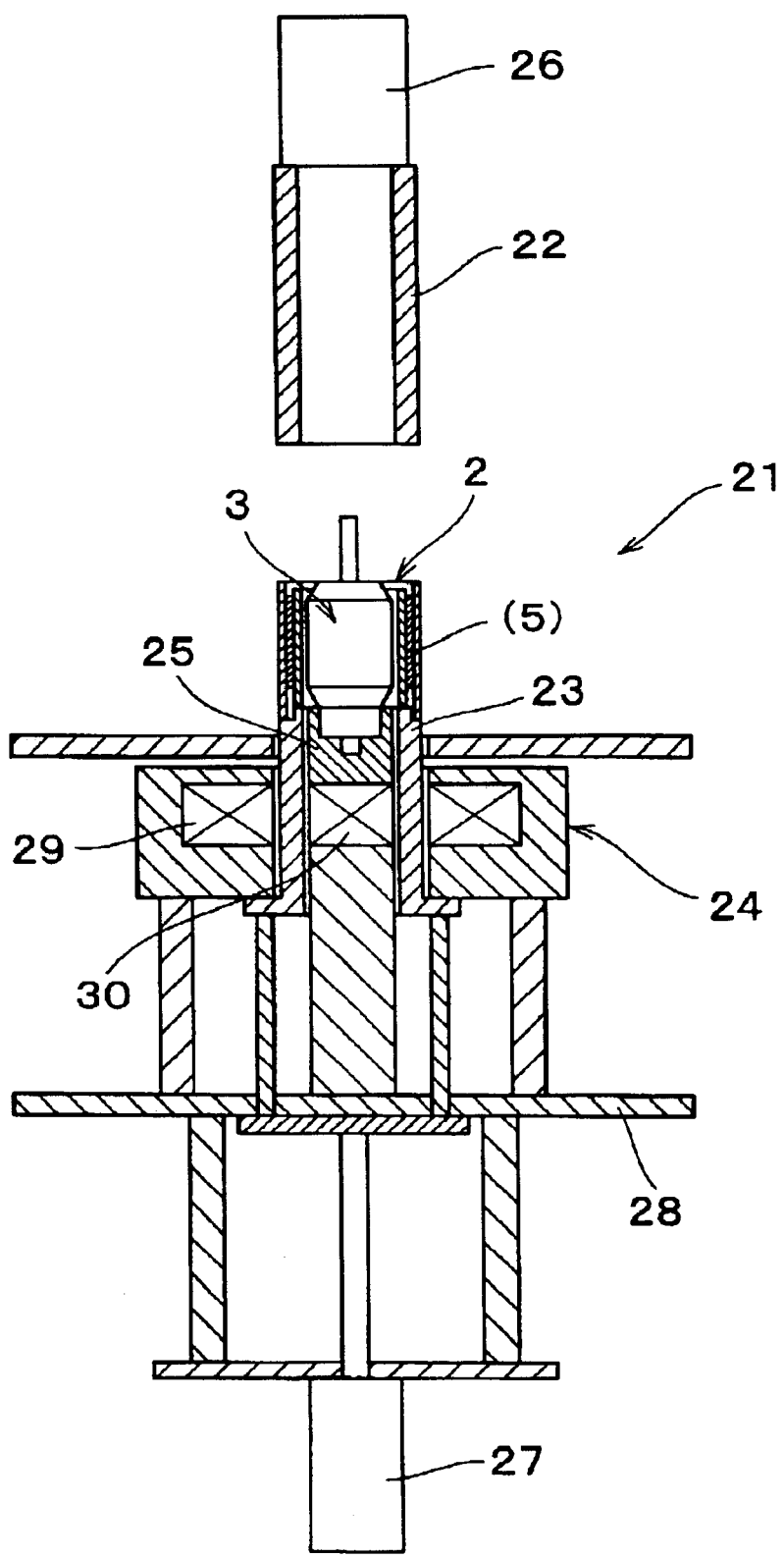
FIG. 4 is a schematic cross sectional view of the embodiment of the motor assembling apparatus similar to FIG. 3 but illustrating a step of assembling a motor.

Now, the operation of magnetizing the permanent magnets 5 and that of mounting the stator 2 and the armature 3 by means of the motor assembling apparatus 21 will be described below. FIGS. 4 through 8 illustrate different steps of operation of the motor assembling apparatus 21. Firstly, the stator support 23 is raised to the upper position H as shown in FIG. 4 and the stator 2 is placed on the stator support 23. The lower end of the armature 3 is fitted into the armature holding hole 32 of the armature holder 25 so that the armature 3 is received by the armature holder 25.

Figure 5:
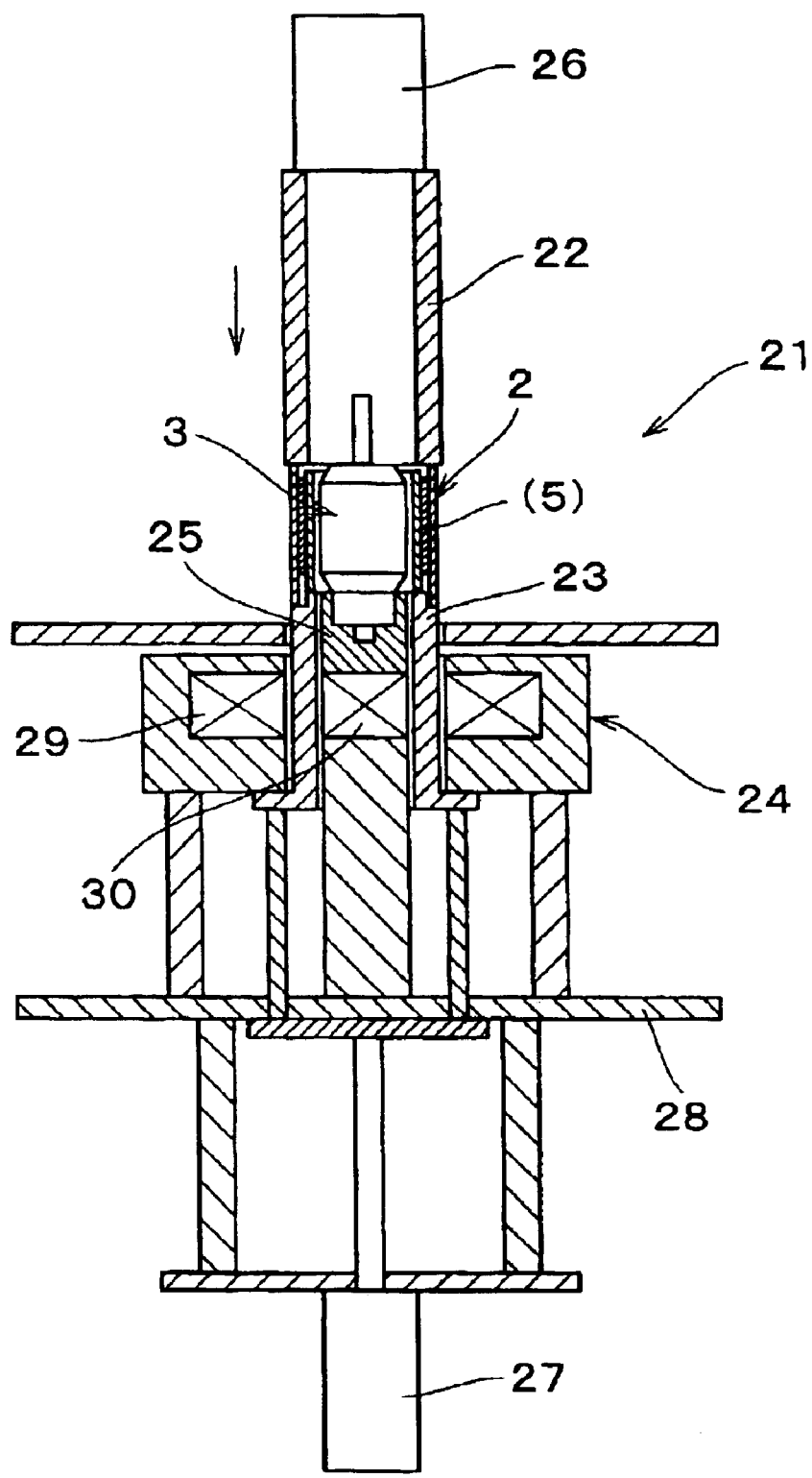
FIG. 5 is a schematic cross sectional view of the embodiment of the motor assembling apparatus similar to FIG. 3 but illustrating a step of assembling the motor that follows the step of FIG. 4.
Figure 6:
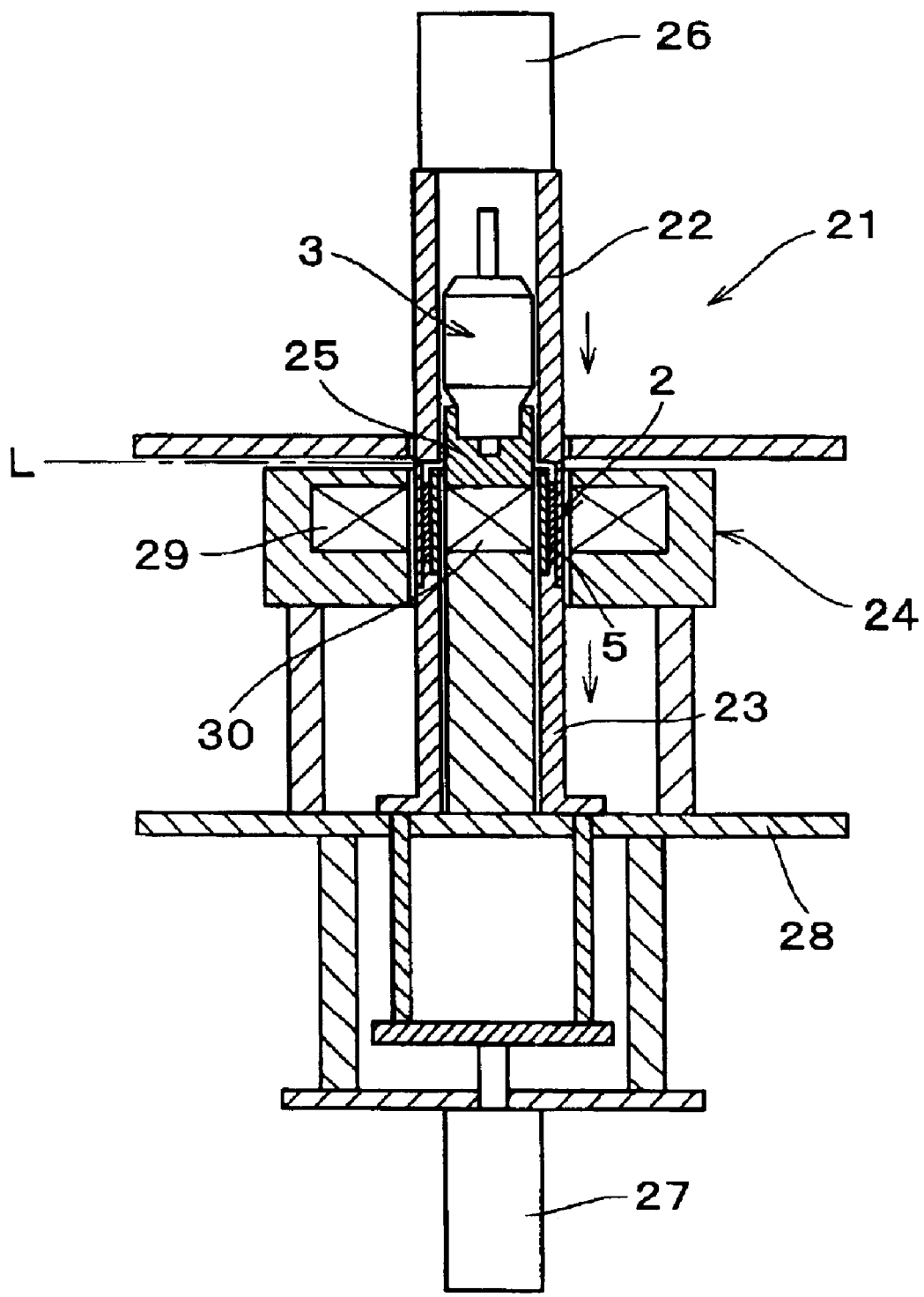
FIG. 6 is a schematic cross sectional view of the embodiment of the motor assembling apparatus similar to FIG. 3 but illustrating a step of assembling the motor that follows the step of FIG. 5.

After placing the stator 2 and the armature 3 in the apparatus, the stator keeping jig 22 is driven to slide down as shown in FIG. 5 until the lower end thereof comes to abut the upper end of the stator 2. Then, the stator 2 is pinched between the stator keeping jig 22 and the stator support 23 and moved downward until the stator support 23 gets to the lower position L as shown in FIG. 6. At this time, the stator 2 is located between the outer magnetizing coil 29 and the inner magnetizing coil 30. Subsequently, the pieces of a rare earth magnet material fitted to the stator 2 are magnetized from both the inside and the outside by applying high density magnetic fluxes to them by means of the magnetizing coils 29, 30 to turn them into so many permanent magnets 5.

Figure 7:
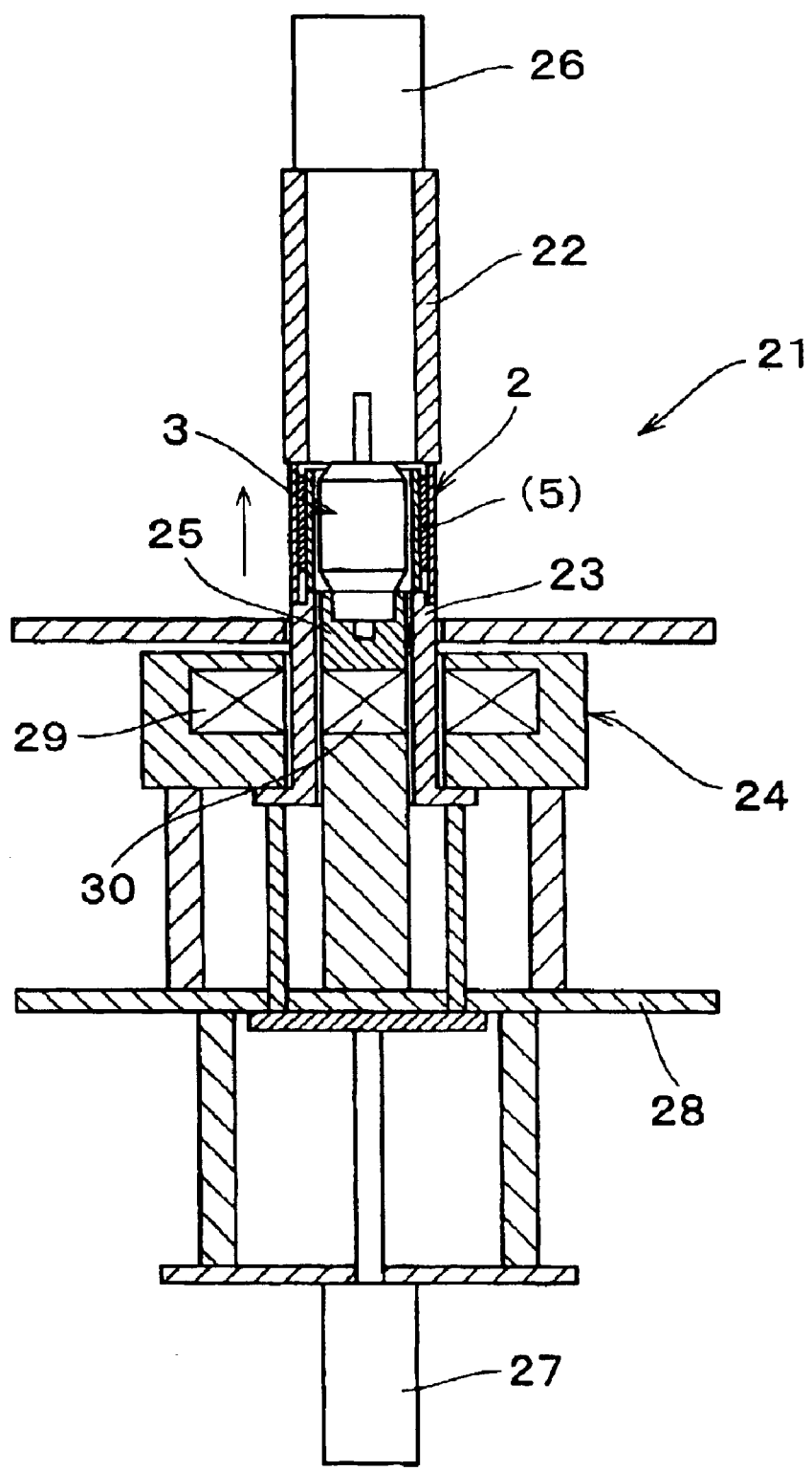
FIG. 7 is a schematic cross sectional view of the embodiment of the motor assembling apparatus similar to FIG. 3 but illustrating a step of assembling the motor that follows the step of FIG. 6.

After completing the operation of producing permanent magnets 5 by magnetization, the stator support 23 and the stator keeping jig 22 are lifted. As a result, the magnetized stator 2 is fitted to the armature 3 that is arranged on the armature holder 25 as shown in FIG. 7. In other words, the stator 2 and the armature 3 are mounted immediately after the operation of magnetizing the stator 2. While the armature holder 25 has no functional feature of aligning the armature with the stator 2 to allow it to show a simple structure that is adapted to simply hold one of the opposite ends of the armature, the armature 3 is securely fitted to the inside of the stator 2 without falling due to the attracting force produced by the high magnetic flux density of the rare earth magnets. Thus, only a single jig is required to hold the armature and no complex mechanism is required to align the armature. Additionally, since the permanent magnets 5 are covered by the magnet cover 6, the armature 3 is prevented from directly touching the permanent magnets 5 and the permanent magnets 5 are prevented from being damaged to produce cracks and/or notches when the stator 2 is fitted to the armature 3.

In this way, the stator 2 and the armature 3 are mourned immediately after the operation of magnetizing the stator 2 by the motor assembling apparatus 21. Therefore, the opportunity for foreign objects to enter the stator 2 is minimized so as to improve the reliability of the manufactured product. Additionally, since the magnetizing step and the mounting step are conducted continuously in the same apparatus, the otherwise dangerous operation is automated to improve both the safety and the efficiency of operation and the number of man-hours is reduced. Furthermore, since the armature holder 25 of the motor assembling apparatus 21 is not required to show a functional feature of aligning, the apparatus itself can be provided at low cost due to the lack of the aligning mechanism.

Figure 8:
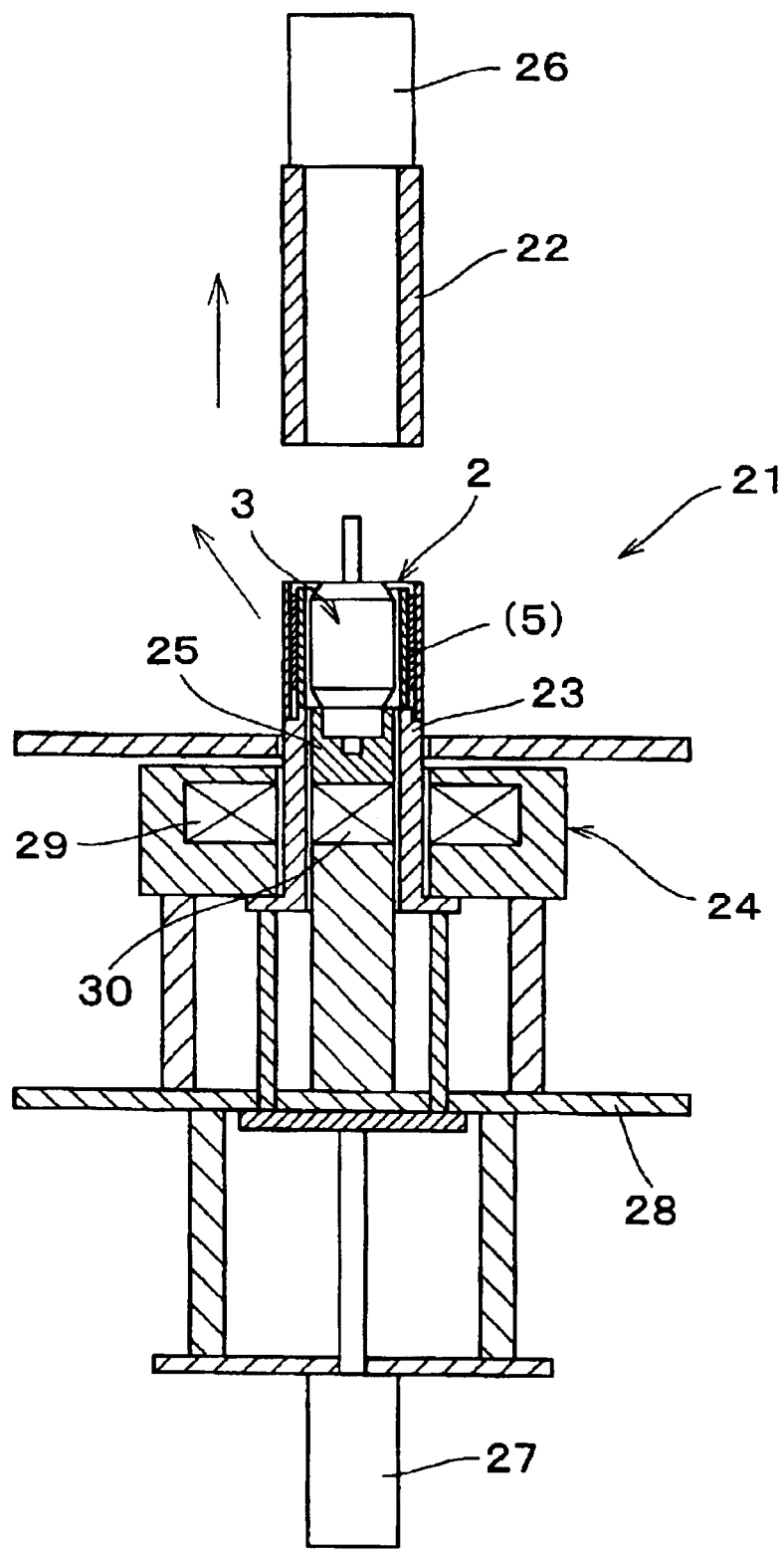
FIG. 8 is a schematic cross sectional view of the embodiment of the motor assembling apparatus similar to FIG. 3 but illustrating a step of assembling the motor that follows the step of FIG. 7.

After mounting the stator 2 and the armature 3 in a manner as described above, the stator keeping jig 22 is lifted upward as shown in FIG. 8 to take out the assembled product. The armature 3 inserted into the stator 2 is held in position by the strong magnetic force of the rare earth magnets so that it would neither come out nor fall down after the product is taken out of the apparatus. Additionally, since a magnetic path is formed in the inside of the armature 3 after inserting the armature 3 into the stator 2, the leakage of magnetic fluxes to the outside is remarkably reduced if compared with the stator that is left standing alone. Therefore, dust particles and other debris are not adsorbed to the stator 2 significantly and hence it is feasible to provide a large stock of prepared stators.

The present invention is not limited to the above-mentioned embodiments. It is further understood by those skilled in the art that various changes and modifications may be made in the present invention without departing from the spirit and scope thereof.

For example, while rare earth magnets are used as permanent magnets 5 for a motor in the above described embodiment, a motor using ferrites magnets as field magnets can also be assembled by means of a motor assembling apparatus according to the invention. Besides, the stator 2 placed on the stator support 23 does not necessarily have to be held at the upper end thereof by the stator keeping jig 22 because it is restricted by the stator receiving section 31 for radial movement and moves with the stator support 23 as the latter moves due to its own weight. However, it will be appreciated that the stator 2 can be mounted to the armature 3 more reliably by the use of a stator keeping jig 22 because the stator 2 is held stable when it is pinched between the stator keeping jig 22 and the stator support 23.

As described above, with a motor assembling apparatus according to the invention, the stator keeping jig and the stator support are adapted to move relative to each other respectively at the outside and at the inside of the magnetizing unit and the armature holder and the magnetized stator can be immediately fitted to the armature that is held on the armature holder by way of sliding movement of the stator support so that the opportunity for foreign objects to enter the stator is minimized so as to improve the reliability of the manufactured product. Additionally, since the magnetizing step and the mounting step are conducted continuously in a same apparatus, the efficiency of operation is improved and the number of assembling steps is reduced.

Still additionally, although the powerful rare earth magnets that are used as permanent magnets for the field can adsorb dust particles and other debris, the opportunity for foreign objects to enter the stator is minimized so as to improve the reliability of the manufactured product because the armature is immediately fitted to the magnetized stator. Additionally, since the magnetizing step and the mounting step are conducted continuously in a same apparatus, the otherwise dangerous operation is automated to improve both the safety and the efficiency of operation and the number of assembling steps is reduced. Furthermore, it is possible to provide an armature holder having no functional feature of aligning the armature with the stator to allow it to show a simple structure that is adapted to simply hold one of the opposite ends of the armature.

What is claimed is:

1. A motor assembling apparatus comprising:
   a magnetizer having an outer magnetizing coil to be arranged outside a cylindrical stator and an inner magnetizing coil to be arranged inside the stator;
   a stator support for supporting a lower end part of the stator, said stator support being arranged so as to be vertically movable between said outer magnetizing coil and said inner magnetizing coil along a central axial line of the stator; and
   an armature holder for holding an end portion of an armature, said armature holder being arranged above said magnetizer, said stator support being adapted to be fitted to an outside of said armature holder;
   the stator having permanent magnets magnetized by said magnetizer being fitted to an outside of the armature held on said armature holder by means of said stator support.

2. The motor assembling apparatus according to claim 1, further comprising
   a stator keeping jig arranged above said stator support in such a way that said stator keeping jig is adapted to abut an upper end part of the stator mounted on said stator support and is adapted to be vertically movable, while pinching the stator between said stator keeping jig and said stator support.

3. The motor assembling apparatus according to claim 2, further comprising
   a jig driving member coupled to said stator keeping jig for vertically moving said stator keeping jig.

4. The motor assembling apparatus according to claim 3, wherein
   said jig driving member comprises an air cylinder.

5. The motor assembling apparatus according to claim 3, further comprising
   a stator support driving member coupled to said stator support for vertically moving said stator support.

6. The motor assembling apparatus according to claim 5, wherein
   said stator support driving member comprises an air cylinder.

7. The motor assembling apparatus according to claim 1, further comprising
   a stator support driving member coupled to said stator support for vertically moving said stator support.

8. The motor assembling apparatus according to claim 7, wherein
   said stator support driving member comprises an air cylinder.

9. The motor assembling apparatus according to claim 1, further comprising
   a support plate immovably securing said magnetizer and said armature holder.

* * * * *